(12) United States Patent
Himeno

(10) Patent No.: US 12,468,956 B2
(45) Date of Patent: Nov. 11, 2025

(54) MEDICAL DOCUMENT MANAGEMENT SYSTEM

(71) Applicant: IRYOU JYOUHOU GIJYUTU KENKYUSHO CORPORATION, Fukuoka (JP)

(72) Inventor: Shinkichi Himeno, Fukuoka (JP)

(73) Assignee: IRYOU JYOUHOU GIJYUTU KENKYUSHO CORPORATION, Fukuoka (JP)

( * ) Notice: Subject to any disclaimer, the term of this patent is extended or adjusted under 35 U.S.C. 154(b) by 1232 days.

(21) Appl. No.: 17/140,499

(22) Filed: Jan. 4, 2021

(65) Prior Publication Data
US 2021/0133608 A1 May 6, 2021

Related U.S. Application Data

(63) Continuation-in-part of application No. PCT/JP2019/024523, filed on Jun. 20, 2019.

(30) Foreign Application Priority Data

Jul. 4, 2018 (JP) ................................ 2018-127518

(51) Int. Cl.
*G06F 17/00* (2019.01)
*G06F 16/22* (2019.01)
(Continued)

(52) U.S. Cl.
CPC ........... *G06N 5/01* (2023.01); *G06F 16/2246* (2019.01); *G06F 16/285* (2019.01); *G06N 5/022* (2013.01);
(Continued)

(58) Field of Classification Search
CPC ........... G06N 5/01; G06N 5/022; G06N 5/04; G06N 7/01; G06F 16/2246; G06F 16/285;
(Continued)

(56) References Cited

U.S. PATENT DOCUMENTS

| 11,264,127 B2* | 3/2022 | Himeno | .................. G06Q 10/10 |
| 2006/0116908 A1* | 6/2006 | Dew | ...................... G16H 10/60 |
| | | | 705/2 |

(Continued)

FOREIGN PATENT DOCUMENTS

| JP | 2002-334112 A | 11/2002 |
| JP | 2009-265758 A | 11/2009 |

(Continued)

OTHER PUBLICATIONS

International Search Report issued on Sep. 17, 2019 of corresponding International Application No. PCT/JP2019/024523; 5 pgs.

(Continued)

*Primary Examiner* — Greta L Robinson
(74) *Attorney, Agent, or Firm* — Maier & Maier, PLLC

(57) ABSTRACT

A knowledge entry management is configured to manage a knowledge entry. The knowledge entry includes a knowledge entry attribute description management configured to store and manage an attribute description about the knowledge entry. The knowledge entry attribute description management includes a reference link from the attribute description to another knowledge entry or an attribute description of the other knowledge entry. The knowledge management reference link is configured to, when creating a medical document, make a reference link usable as a word or phrase to describe details of the medical document.

22 Claims, 20 Drawing Sheets

(51) Int. Cl.
   *G06F 16/28* (2019.01)
   *G06N 5/01* (2023.01)
   *G06N 5/022* (2023.01)
   *G16H 10/60* (2018.01)
   *G16H 50/20* (2018.01)
   *G16H 50/70* (2018.01)
   *G06N 5/04* (2023.01)

(52) U.S. Cl.
   CPC .......... *G16H 10/60* (2018.01); *G16H 50/20* (2018.01); *G16H 50/70* (2018.01); *G06N 5/04* (2013.01)

(58) Field of Classification Search
   CPC .......... G06F 16/00; G06F 16/28; G06F 16/90; G16H 10/60; G16H 50/20; G16H 50/70; G16H 70/60; G16H 70/20
   See application file for complete search history.

(56) References Cited

U.S. PATENT DOCUMENTS

| | | | |
|---|---|---|---|
| 2007/0033261 A1 | 2/2007 | Wagner et al. | |
| 2008/0040151 A1* | 2/2008 | Moore | G16H 40/67 705/2 |
| 2012/0072387 A1 | 3/2012 | Yanase | |
| 2013/0006665 A1* | 1/2013 | Fernandez | G16H 50/70 705/3 |
| 2013/0138458 A1* | 5/2013 | Lorsch | G16H 10/60 705/3 |
| 2014/0344679 A1* | 11/2014 | Larsen | G16H 10/60 715/256 |
| 2017/0169169 A1* | 6/2017 | Kido | G06F 16/9024 |
| 2017/0228500 A1* | 8/2017 | Massengale | G06Q 10/10 |
| 2022/0198285 A1* | 6/2022 | Himeno | G16H 70/40 |

FOREIGN PATENT DOCUMENTS

| | | |
|---|---|---|
| JP | 2012-033181 A | 2/2012 |
| JP | 2012-119004 A | 6/2012 |
| JP | 2013-105401 A | 5/2013 |
| JP | 2015-099614 A | 5/2015 |
| JP | 2016-042308 A | 3/2016 |
| WO | 2015/186205 A | 12/2015 |

OTHER PUBLICATIONS

Notice of Reasons for Refusal issued on Jan. 23, 2020 of corresponding International Application No. 2018-127518; 16 pgs.
Ohe, "Ontology Representation and Utilization of Clinical Medical Knowledge" (www.jstage.jst.go.jp/article/johokanri/52/12/52_12_701/_pdf), 2006, 4 pgs.

* cited by examiner

Fig 2

KNOWLEDGE ENTRY
MANAGEMENT MASTER

| KNOWLEDGE ENTRY ID | |
|---|---|
| 1 | CHEST PAIN |
| 2 | STOMACHACKE |
| 3 | THORACIC OPPRESSIVE PAIN |
| 4 | HEMATOLOGIC TEST |
| ⋮ | ⋮ |

Fig 3

```
┌─────────────────┐
│  LEUKOCYTOSIS   │
└─────────────────┘
```

<DISEASE THAT BECOMES POSITIVE>

INFECTIOUS DISEASE

LEUKEMIA

⋮

<RELATED TEST>

CRP

DIFFERENTIAL WHITE BLOOD COUNT

BLOOD PROTEIN FRACTION

⋮

CONTENTS IN <> INDICATE KNOWLEDGE ENTRY ATTRIBUTE CATEGORY

Fig 4

KNOWLEDGE ENTRY ATTRIBUTE CATEGORY MANAGEMENT MASTER

| KNOWLEDGE ENTRY ATTRIBUTE CATEGORY ID | KNOWLEDGE ENTRY ATTRIBUTE CATEGORY NAME |
|---|---|
| 1 | DISEASE THAT BECOMES POSITIVE |
| 2 | RELATED TEST |
| 3 | |
| ⋮ | ⋮ |

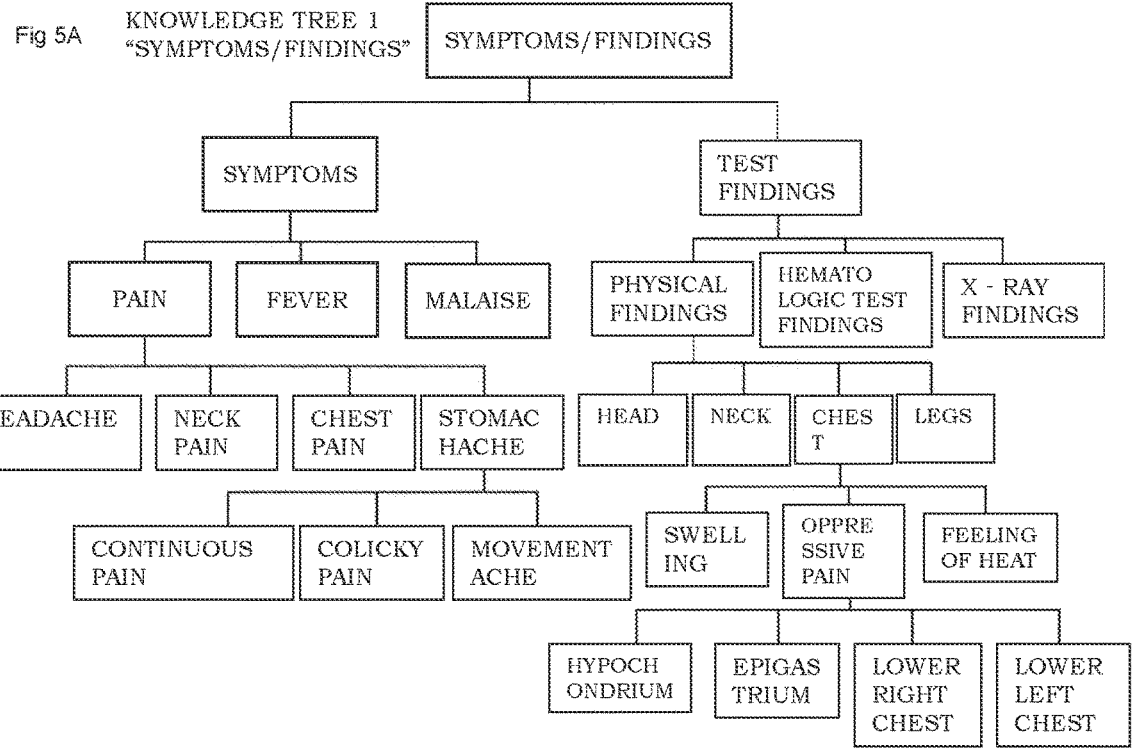
Fig 5A KNOWLEDGE TREE 1 "SYMPTOMS/FINDINGS"
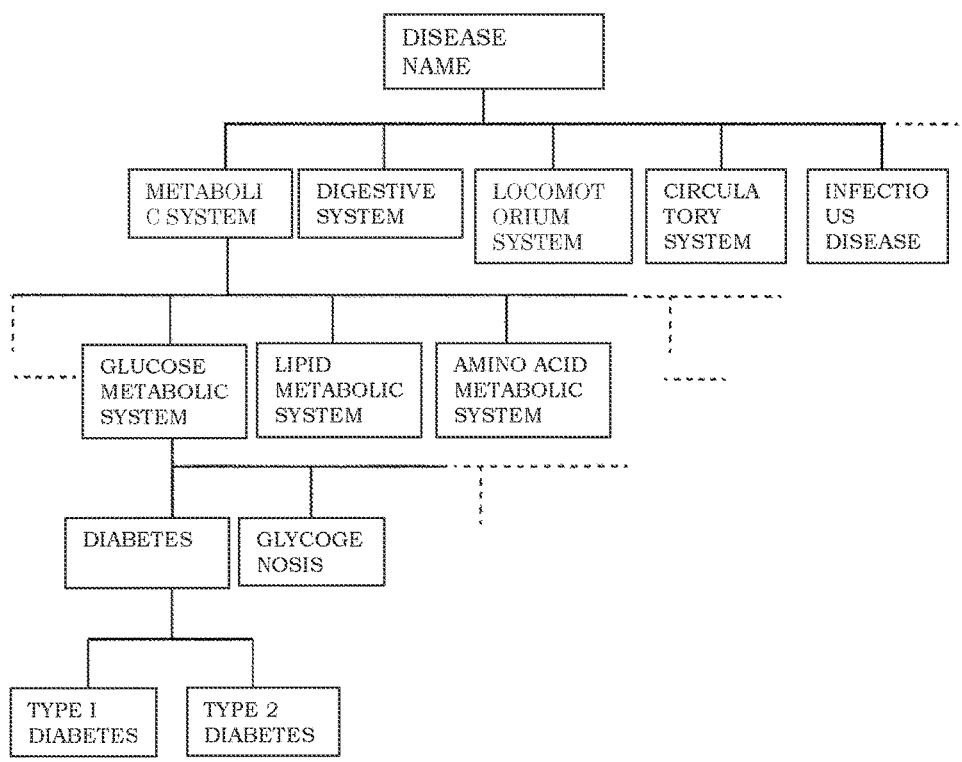
Fig 5B KNOWLEDGE TREE 2 "DISEASE NAME"

Fig 6

KNOWLEDGE TREES MANAGEMENT MASTER

| KNOWLEDGE TREE ID | KNOWLEDGE ENTRY NAME |
|---|---|
| 1 | SYMPTOMS/ FINDINGS |
| 2 | DISEASE NAME |
| 3 | DRUG |
| 4 | TREATMENT |
| ⋮ | ⋮ |

Fig 7

KNOWLEDGE TREE ID-ADDED KNOWLEDGE
ENTRY MANAGEMENT MASTER

| KNOWLEDGE TREE ID | KNOWLEDGE ENTRY ID | KNOWLEDGE ENTRY NAME |
|---|---|---|
| 1 | 1 | SYMPTOMS/ FINDINGS |
| 1 | 2 | SYMPTOMS |
| 1 | 3 | TEST SYMPTOMS |
| 1 | 4 | PAIN |
| 1 | 5 | FEVER |
| ⋮ | ⋮ | ⋮ |

Fig 8

EXAMPLE OF KNOWLEDGE ENTRY ATTRIBUTE CATEGORY MANAGEMENT MEANS

| KNOWLEDGE TREE ID | KNOWLEDGE ENTRY ATTRIBUTE CATEGORY ID | KNOWLEDGE ENTRY ATTRIBUTE CATEGORY NAME |
|---|---|---|
| 2 | 1 | ETIOLOGY |
| 2 | 2 | DISEASE STATE |
| 2 | 3 | SYMPTOMS |
| 2 | 4 | TEST FINDINGS |
| 2 | 5 | TREATMENT |
| 2 | 6 | CASE |
| 2 | 7 | LITERATURE |
| ⋮ | ⋮ | ⋮ |

Fig 9A

TYPE I DIABETES

<DISEASE STATE>
   DECREASED INSULIN SECRETION
   HYPERGLYCEMIA
   URINARY SUGAR EXCRETION

<COMPLICATION>
   RENAL FAILURE
   ARTERIOSCLEROSIS OBLITERANS

<ETIOLOGY>
   PANCREATIC β-CELL NECROSIS

<TREATMENT>
   INSULIN INJECTION

<CASE>
   AA HOSPITAL PATIENT ID-29567
   BB CLINIC PATIENT ID=87-256

Fig 9B

YPE II DIABETES

<DISEASE STATE>
   DECREASED INSULIN SECRETION
   HYPERGLYCEMIA
   URINARY SUGAR EXCRETION

<COMPLICATION>
   RENAL FAILURE
   ARTERIOSCLEROSIS OBLITERANS

<ETIOLOGY>
   OBESITY
   SUGER OVEREATING

<TREATMENT>
   DIETARY RESTRICTION
   HYPOGLYCEMIC AGENT
   INSLIN

<CASE>
CC HOSPITAL PATIENT ID=3958
AA HOSPITAL PATIENT ID=29895
DD CLINIC PATIENT ID=4987

LINK TO PATIENT MEDICAL RECORD IN HEALTH FACILITY

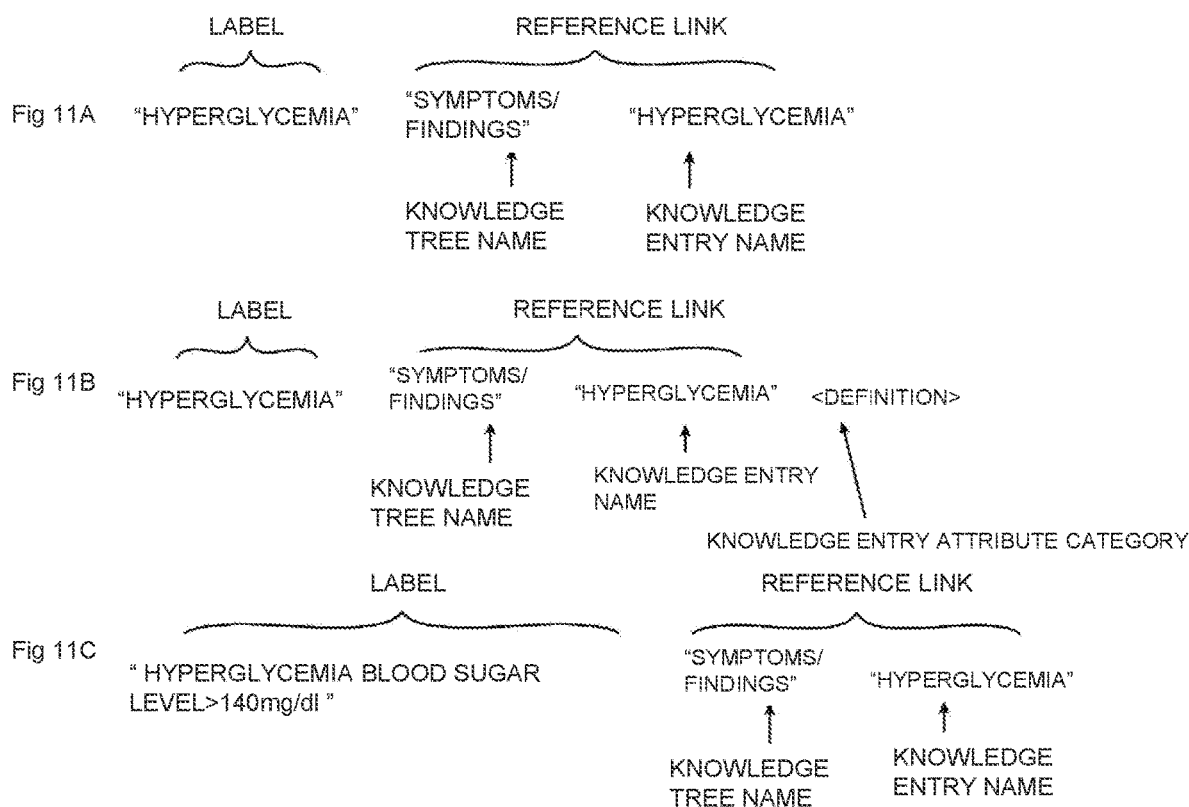

Fig 12

KNOWLEDGE TREE "DRUG"

KNOWLEDGE ENTRY "FUROSEMIDE"

KNOWLEDGE ENTRY ATTRIBUTE CATEGORY <SIDE EFFECTS AND INCIDENCE>

|  | LABEL | REFERENCE INTENSITY | REFERENCE LINK | |
|---|---|---|---|---|
| REFERENCE LINK 1 | "HYPERKALEMIA" | "5 %" | "SYMPTOMS/ FINDINGS" ↑ KNOWLEDGE TREE NAME | "HYPERKALEMIA" ↑ KNOWLEDGE ENTRY NAME |
| REFERENCE LINK 2 | "DEHYDRATION" | "1 %" | "SYMPTOMS/ FINDINGS" ↑ KNOWLEDGE TREE NAME | "HYPERKALEMIA" ↑ KNOWLEDGE ENTRY NAME |

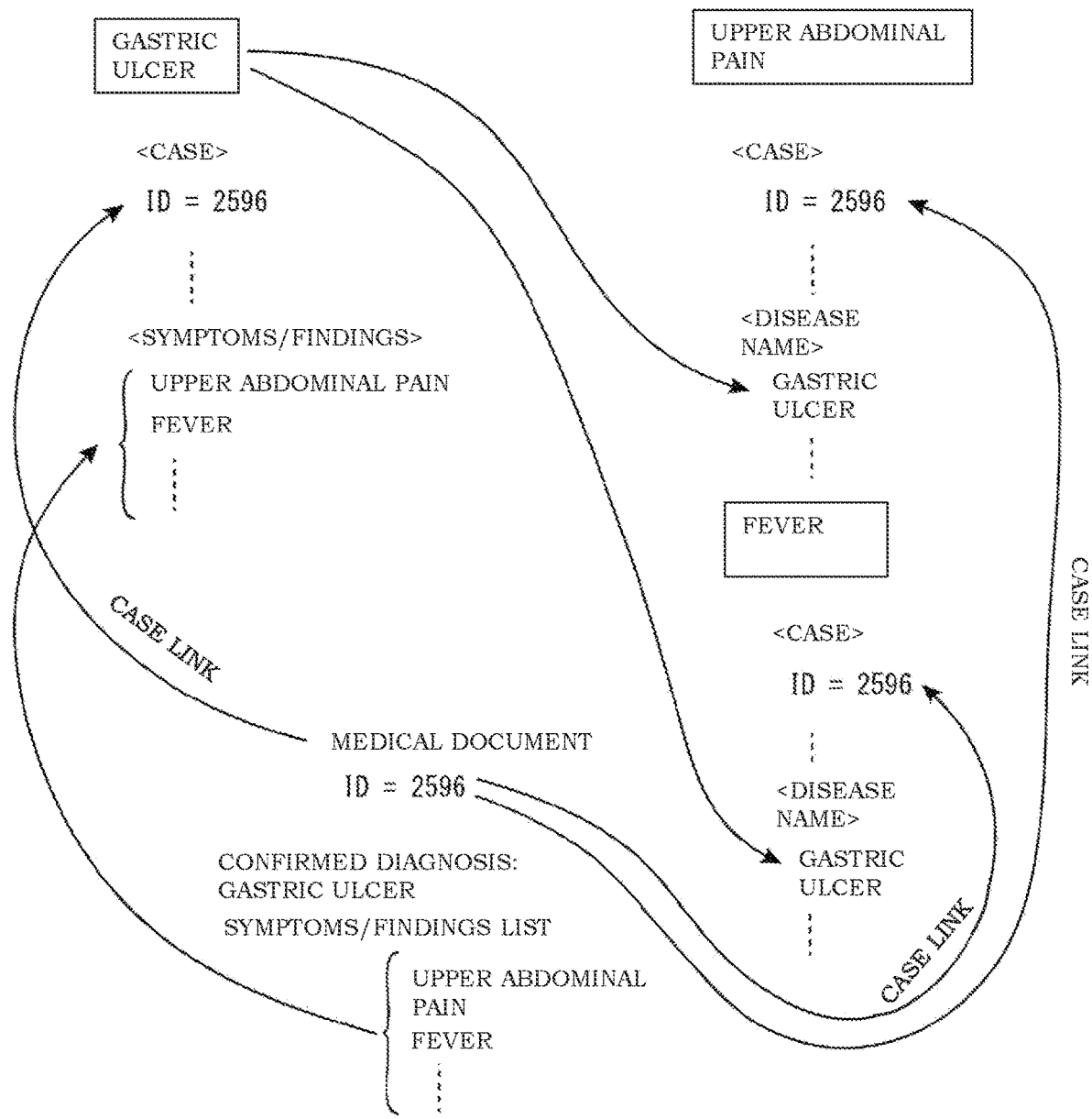
Fig 15 PROCESS AFTER DIAGNOSIS CONFIRMATION

Fig 16

| GASTRIC ULCER |

<CASE>

ID = 2596

ID = 3943

⋮

<SYMPTOMS/FINDINGS>

UPPER ABDOMINAL PAIN
ID = 2596

FEVER ID = 2596

MELENA ID = 2596

UPPER ABDOMINAL PAIN
ID = 3943

MELENA ID = 3943

⋮

<SIMULTANEOUSLY OBSERVED
SYMPTOMS/FINDINGS>

UPPER ABDOMINAL PAIN   FEVER ID = 2596

UPPER ABDOMINAL PAIN   MELENA ID = 2596

FEVER   MELENA ID = 2596

UPPER ABDOMINAL PAIN   MELENA ID = 3943

⋮

| UPPER ABDOMINAL PAIN |

<CASE>

ID = 2596

ID = 3943

⋮

<SIMULTANEOUSLY OBSERVED
SYMPTOMS/FINDINGS>

FEVER ID = 2596

MELENA ID = 2596

MELENA ID = 3943

```
┌─────────┐
│ GASTRIC │
│ ULCER   │
└─────────┘

<NUMBER OF CASES>

3 5 6

<SYMPTOMS>

UPPER CHEST PAIN 95

LOWER ABDOMINAL PAIN 60

NAUSEA 50

<FINDINGS>

LEUKOCYTOSIS 80

CRP RISE 75

⋮
```

```
┌──────────────────┐
│ UPPER ABDOMINAL  │
│ PAIN             │
└──────────────────┘

<NUMBER OF CASES>

8 5 3

<DISEASE NAME>

GASTRIC ULCER 68

CYSTITIS 23

GASTRIC CANCER 15

⋮

┌──────────────┐
│ LEUKOCYTOSIS │
└──────────────┘

<NUMBER OF CASES>

4 5 1

<DISEASE NAME>

PNEUMONIA 73

CYSTITIS 55

GASTRIC ULCER 15

NAME SPACE MANAGEMENT MEANS

| NAME SPACE ID | NAME SPACE NAME |
|---|---|
| 1 | MEDICAL CARE |
| 2 | ART |
| 3 | INDUSTRY |
| 4 | |
| ... | ... |

MEDICAL DOCUMENT MANAGEMENT SYSTEM

TECHNICAL FIELD

The present invention relates to a medical document management system that efficiently performs creation, search, or the like of a medical document using knowledge management means for efficiently accumulating or searching for knowledge necessary to perform inference, judgement, recognition, or the like.

BACKGROUND ART

If a computer can be caused to perform judgement or inference routinely performed by humans, routine work can be processed in a large amount and at high speed or simplified. Systems for that purpose have been developed.

In the initial stage, expert systems were developed that previously accumulate judgement rules, such as "if A, then B" and "if B, then C," and, when a proposition "D is A" is given, sequentially apply the previously accumulated judgement rules and infer that "D is C." There is known "MYCIN," which infers an antibiotic most suitable for an infectious disease.

More flexible search has been needed since the entry into the Internet era. For example, such search is to replay to a question "E is musician?" using records or declarations on the Web, such as "E is violinist," "violinist is musician," and "conductor is musician" (Semantic Web).

Subordinate concepts, such as "violinist," "conductor," and "composer," are developed under a superordinate concept "musician." By describing the concepts structurally (ontology) as described above, it can be inferred that "E is violinist and therefore is also musician" even if there is no direct description "E is musician" on the Web. That is, the above question can be answered correctly.

In this case, it is necessary to previously describe individual concepts or relations in a unified style using a format, such as XML, so that concepts in many fields can be searched for interdisciplinarily. As one example of the unified format, the Resource Description Framework (RDF) is proposed. The RDF's way of describing a concept or relation for each piece is compatible with program languages, such as Prolog, and easily adapts itself to relational databases.

The medical field has also attempted to construct disease ontologies as shown in Non-Patent Literature 1 below. The general industrial field has also proposed Patent Literature 1 and the like.

The medical field is introducing electronic health record systems, which electronically create medical records. Electronic health record systems are able to create medical documents easily by searching or replicating accumulated electronic documents and thus are being used widely.

CITATION LIST

Non-Patent Literature
  Non-Patent Literature 1: Ontology Representation and Utilization of Clinical Medical Knowledge (Https://www.jstage.jst.go.jp/article/johokanri/52/12/52_12_701/_pdf)
Patent Literature
  Patent Literature 1: Japanese Unexamined Patent Application Publication No. 2012-119004.

SUMMARY OF INVENTION

Technical Problem

Initial expert systems take much effort to accumulate a large amount of judgement rules necessary for practical-level operation. Also, the condition portion A of "if A, then B" is applied only to a description that precisely matches the condition portion A. Accordingly, if "musician" with respect to "violinist" is searched for, as is done in the above example, there would be no matching description.

Semantic Web has become able to support fuzzy search to some extent using a kind of common sense that "violinist," "conductor", "composer," and the like are also included in the subordinate concept of "musician," on the basis of a structural description, such as an ontology. However, when a specific ontology is actually constructed, the same content can be described in multiple styles and the described structure fluctuates among constructors. This is because the degree of freedom of the description format is excessively high. Thus, the same content is often described in different styles. In this case, when multiple persons construct multiple ontologies as parallel work, confusion would occur due to the mismatch between the description formats. Also, since various description formats are mixed, the developed ontology is not easily visually comprehensible in many cases and is often poor in readability.

Even if individual knowledge pieces, such as knowledge areas, knowledge items, attribute descriptions, and parent-child relationship descriptions, are described in a format, such as RDF, similar fluctuations in the description format are unavoidable. An ontology is originally an enumeration of a large amount of knowledge pieces, has difficulty in providing an overview of the knowledge, and is extremely poor in readability.

To efficiently describe a large amount of knowledge, it is necessary to, needless to say, use a computer-understandable format, as well as to provide readability such that humans also can easily visually recognize the description. The ability to easily describe knowledge without special knowledge or skills and the ability to easily point out a contradiction or the like when seeing the description are characteristics essential for many persons having knowledge in certain fields but not being experts about a computer to construct ontologies or the like in parallel while cooperating with each other through the Web, as recommended in WEB2.0.

Medical professionals including medical doctors use words, phrases, or expressions at their discretion when creating a medical document. For this reason, the range of content of the description varies. When collecting statistical data, an extremely large amount of data is missing, resulting in imperfect analysis.

Even if descriptions have the same content, the words, phrases, or expressions greatly fluctuate. For this reason, the descriptions are difficult to process in a unified way, and whether the descriptions have the same content must be determined manually.

These facts also contribute to causing medical documents to remain simple descriptions of the situation. Under the current circumstances, medical documents are far from intelligentization such that a list of probable disease names is interred from the content of the description or a test or finding useful to differentiate diseases from each other is recommended.

The present invention has been made to solve the above conventional problems, and an object thereof is to allow for systemically describing knowledge without fluctuations in expression by clearly categorizing and organizing knowledge in a certain area into multiple knowledge trees, wherein, in each knowledge tree, knowledge entries forming the tree are developed in a parent-child relationship hierarchical structure, each knowledge entry is a set of entry attribute descriptions about the knowledge entry, and each entry attribute description includes a reference link to another knowledge entry or an entry attribute description of the other knowledge entry. Another object is to inherit entry attribute descriptions of a parent knowledge entry as entry attribute descriptions of a child knowledge entry and thus to eliminate the need to describe attribute descriptions in an overlapping manner. Another object is to allow for concentrating on construction of a knowledge system in the area of interest without having to worry about overlaps with knowledge tree names or knowledge entry names in another area by allowing for managing knowledge trees in the other area as different independent knowledge trees separated by name spaces. Another object is to, by establishing such a knowledge management framework, allow for constructing a knowledge management system that provides good readability not only allowing for machine processing but also allowing humans to understand the content at a glance and that prevents fluctuations in expression even if anyone creates a document and thus to provide a knowledge processing infrastructure that allows for flexible, high-level search or inference. Another object is to allow for reconfiguration of a knowledge management system by extracting and integrating part or all of the above-mentioned knowledge management system into another knowledge management system and thus to allow for flexible operation of the knowledge management system.

Another object is to allow for effective utilization of the knowledge management system in the real society by allowing the knowledge management system to receive an inquiry and respond to the inquiry. Another object is to ensure security against destruction or confusion by allowing for managing the user-specific performance authorities and setting the search scope.

Another object is to, when creating a medical document, allow for suppressing fluctuations in expression and making a standardized description that can withstand later statistical analysis, by using reference links to knowledge entries or attribute descriptions defined by the knowledge management means as words and phrases.

Another object is to allow for preventing missing description or check omission by incorporating judgement logic into a reference link and thus to allow for describing a document having high integrity or issuing a safe medical instruction document.

Another object is to allow for accurate, efficient diagnosis by using the incidence of disease-specific symptoms or findings efficiently accumulated in the knowledge management means to infer a list of possible diseases or recommend a test or finding acquisition useful to identity the disease.

Solution to Problem

As means to achieve the above objects, a medical document management system includes (i) knowledge management means including knowledge entry management means configured to, when storing and managing knowledge, manage at least one knowledge entry, the knowledge entry including knowledge entry attribute description management means configured to store and manage an attribute description about the knowledge entry, the knowledge entry attribute description management means including a reference link from the attribute description to another knowledge entry or an attribute description of the other knowledge entry, and (ii) medical document creation means including knowledge management reference link use means configured to, when creating a medical document, make the reference link of the knowledge management means usable as a word or a phrase to describe details of the medical document.

In the medical document management system, the knowledge entry attribute description management means includes knowledge entry attribute category management means configured to manage the knowledge entry attribute description such that the knowledge entry attribute description is categorized.

According to the medical document management system, in the medical document management system, the knowledge management means includes knowledge trees management means configured to manage at least one knowledge tree and knowledge entry management means configured to manage at least one knowledge entry present in each of the at least one knowledge tree, the knowledge entry management means being extended so as to be used for a knowledge tree structure. Each of the at least one knowledge entry includes a knowledge entry attribute description that describes an attribute about the knowledge entry and a knowledge entry parent-child relationship link that describes a parent-child relationship with another knowledge entry of the knowledge tree. The knowledge entry attribute description includes a reference link to a knowledge entry belonging to a different knowledge tree or the same knowledge tree, or a knowledge entry attribute category of the knowledge entry, or a knowledge entry attribute description of the knowledge entry.

According to the medical document management system, in the medical document management system, the reference link includes external document reference means configured to refer to one or more external documents relating to the knowledge entry attribute description, or a description in the one or more external documents.

According to the medical document management system, in the medical document management system, the reference link includes script execution means configured to manage a script to be executed when making reference.

According to the medical document management system, in the medical document management system, the reference link includes reference intensity management means configured to set reference intensity and to make the reference intensity variable in accordance with an observation.

According to the medical document management system, in the medical document management system, the parent-child relationship includes knowledge entry attribute description inheritance means configured to inherit a knowledge entry attribute description of a parent knowledge entry as a knowledge entry attribute description of a child knowledge entry.

According to the medical document management system, in the medical document management system, the reference link includes case link creation means configured to create a case link from a medical document comprising referenced words and phrases to a reference- source knowledge entry or a knowledge entry attribute description of the reference-source knowledge entry.

According to the medical document management system, in the medical document management system, the case link creation means includes symptom/finding-specific case link creation means configured to create a symptom/finding-specific case link in a knowledge entry representing each of symptoms or findings observed in a case or each of pairs of symptoms or findings simultaneously observed in the case.

According to the medical document management system, in the medical document management system, the symptom/finding case link creation means includes symptom/finding-specific case link compilation means configured to categorize and compile case links on a symptom or finding basis.

According to the medical document management system, in the medical document management system, the symptom/finding case link creation means includes confirmed disease symptom/finding case link creation means configured to, when a disease name of the case is confirmed, create the symptom/finding-specific case link to each of the simultaneously observed symptoms or findings in a knowledge entry representing the disease name.

According to the medical document management system, the medical document management system includes similar case search means configured to obtain a list of cases similar to a disease name-unconfirmed case by obtaining an intersection of sets of already created case links with respect to each of symptoms or findings or pairs of symptoms or findings observed in a medical document of the disease name-unconfirmed case.

According to the medical document management system, in the medical document management system, the similar case search means includes similar case disease name inference means configured to compile confirmed disease names in the obtained list of similar cases and to display the confirmed disease names in the descending order of frequency.

According to the medical document management system, the medical document management system includes disease name list inference means configured to infer a list of probable disease names of a disease name-unconfirmed case by using a disease name-specific symptom/finding observation frequencies compiled from symptoms or findings observed in a medical document of the disease name-unconfirmed case using the symptom/finding-specific case link compilation means, or disease name frequency distribution about the observed respective symptoms or findings, or both.

According to the medical document management system, the medical document management system includes consultation/test recommendation means configured to obtain a list of symptoms or findings whose frequency distribution greatly varies among disease names, from the plurality of disease names obtained by the disease name list inference means, using the disease name-specific symptom/finding observation frequencies compiled using the symptom/finding-specific case link compilation means and to infer a list of symptoms or findings to be obtained next that is effective in identifying the disease name, from the obtained list.

According to the medical document management system, in the medical document management system, the consultation/test recommendation means includes consultation/test recommendation display means configured to, when creating a medical document, automatically display a symptom or finding to be obtained through a consultation or a recommendation list of tests to be performed so that smooth creation of a consultation record or a test order is facilitated.

According to the medical document management system, in the medical document management system, the knowledge trees management means includes name space management means configured to separate and manage multiple knowledge trees using name spaces.

According to the medical document management system, the medical document management system includes knowledge export means configured to create a knowledge management subset by extracting any portion of a name space, a knowledge tree, a knowledge entry, an entry attribute description, and a parent-child relationship link forming the knowledge management system and to export the knowledge management subset to another knowledge management system.

According to the medical document management system, the medical document management system of claim 18 includes knowledge import means configured to import the knowledge management subset extracted by the knowledge export means or a knowledge management subset from a separately constructed knowledge management system and to reconfigure a name space, a knowledge tree, a knowledge entry, an entry attribute description, and a parent-child relationship link.

According to the medical document management system, the medical document management system includes user authority management means configured to manage user-specific authorities to perform functions of creating, editing, deleting, and referring to a name space, a knowledge tree, a knowledge entry, a knowledge entry attribute category, a knowledge entry attribute description, and a parent-child relationship link in the knowledge management means and to manage user-specific authorities to perform functions of creating, editing, deleting, and referring to a medical document in the medical document creation means.

According to the medical document management system, in the medical document management system, the knowledge management means includes knowledge view means configured to view a parent-child relationship between the knowledge entries or details of knowledge attribute descriptions of the knowledge entries.

According to the medical document management system, in the medical document management system, (i) the knowledge management means includes knowledge inquiry reception means configured to receive an inquiry about details of stored and managed knowledge and knowledge inquiry response means configured to respond to details of an inquiry; and/or (ii) the medical document creation means includes medical document details inquiry reception means configured to receive an inquiry about details of a stored and managed medical document and medical document details inquiry response means configured to respond to details of an inquiry.

Advantageous Effects of Invention

The medical document management system includes the knowledge entry management means. Thus, a knowledge entry-based information categorization system is constructed.

The knowledge entry attribute description management means is provided. Thus, information belonging to each knowledge entry is stored in the knowledge entry attribute description management means.

The knowledge management means including the reference links is provided. Thus, a system that widely collects information through the reference links is constructed.

The knowledge management reference link use means is provided. Thus, the reference links of the knowledge management means can be used as words or phrases to describe details of a medical document.

The medical document management system of includes the knowledge entry attribute category management means. Thus, the knowledge entry attribute description is managed so as to be categorized.

The medical document management system of includes the knowledge entry management means extended so as to be used for a knowledge tree structure. Thus, there is constructed an information management system that manages the knowledge trees management means configured to manage knowledge trees and at least one knowledge entry present in each knowledge tree and that is extended so as to be used for a knowledge tree structure.

The knowledge entry parent-child relationship link is provided. Thus, the parent-child relationship between the knowledge entry attribute description describing the attribute about the knowledge entry and another knowledge entry of the knowledge tree is described and stored.

The knowledge entry attribute description includes a knowledge entry belonging to a different knowledge tree or the same knowledge tree, or a knowledge entry attribute category of the knowledge entry, or a reference link to the knowledge entry attribute description of the knowledge entry. Thus, a system that widely collects information through reference links is constructed.

The medical document management system includes the external document reference means and thus is able to create a document while referring to one or more external documents relating to the knowledge entry attribute description or a description in the one or more external documents.

The medical document management system includes the script execution means and thus is able to select a suitable script in accordance with the type of the reference link, or the like and to execute it.

The medical document management system includes the reference intensity management means and thus is able to manage the priority of the reference link by setting reference intensity and making the reference intensity variable in accordance with an observation.

The medical document management system includes the knowledge entry attribute description inheritance means and thus is able to inherit the knowledge entry attribute description of the parent knowledge entry as the entry attribute description of the child knowledge entry.

The medical document management system includes the case link creation means and thus is able to create a case link from a medical document comprising referenced words and phrases to a reference-source knowledge entry or a knowledge entry attribute description of the reference-source knowledge entry.

The medical document management system includes the symptom/finding-specific case link creation means and thus is able to create a symptom/finding-specific case link in a knowledge entry representing each of symptoms or findings observed in a case or each of pairs of symptoms or findings simultaneously observed in the case.

The medical document management system includes the symptom/finding-specific case link compilation means and thus is able to categorize and compile the case links on a symptom or finding basis.

The medical document management system includes the confirmed disease symptom/finding case link creation means and thus, when a disease name of the case is confirmed, is able to create the symptom/finding-specific case link to each of the simultaneously observed symptoms or findings in a knowledge entry representing the disease name.

The medical document management system includes the similar case search means and thus is able to obtain a list of cases similar to a disease name-unconfirmed case by obtaining an intersection of sets of already created case links with respect to each of symptoms or findings or pairs of symptoms or findings observed in a medical document of the disease name- unconfirmed case.

The medical document management system includes the similar case disease name inference means and thus is able to compile confirmed disease names in the obtained list of similar cases and to display the confirmed disease names in the descending order of frequency.

The medical document management system includes the disease name list inference means and thus is able to infer a list of probable disease names of a disease name-unconfirmed case by using a disease name-specific symptom/finding observation frequencies compiled from symptoms or findings observed in a medical document of the disease name-unconfirmed case using the symptom/finding-specific case link compilation means, or disease name frequency distribution about the observed respective symptoms or findings, or both.

The medical document management system includes the consultation/test recommendation means and thus is able to obtain a list of symptoms or findings whose frequency distribution greatly varies among disease names, from the plurality of disease names obtained by the disease name list inference means, using the disease name-specific symptom/finding observation frequencies compiled using the symptom/finding-specific case link compilation means and to infer a list of symptoms or findings to be obtained next that is effective in identifying the disease name, from the obtained list.

The medical document management system includes the consultation/test recommendation display means and thus, when creating a medical document, is able to automatically display a symptom or finding to be obtained through a consultation or a recommendation list of tests to be performed so that smooth creation of a consultation record or a test order is facilitated.

The medical document management system includes the name space management means and thus is able to separate and manage multiple knowledge trees using name spaces.

The medical document management system includes the knowledge export means and thus is able to create a knowledge management subset by extracting any portion of a name space, a knowledge tree, a knowledge entry, an entry attribute description, and a parent-child relationship link forming the knowledge management system and to export the knowledge management subset to another knowledge management system.

The medical document management system includes the knowledge import means and thus is able to import the knowledge management subset extracted by the knowledge export means or a knowledge management subset from a separately constructed knowledge management system and to reconfigure a name space, a knowledge tree, a knowledge entry, an entry attribute description, and a parent-child relationship link.

The medical document management system includes the user authority management means and thus is able to manage user-specific authorities to perform functions of creating, editing, deleting, and referring to a name space, a knowledge tree, a knowledge entry, a knowledge entry attribute category, a knowledge entry attribute description, and a parent-child relationship link in the knowledge management means and to manage user-specific authorities to perform functions of creating, editing, deleting, and referring to a medical document in the medical document creation means.

The medical document management system includes the knowledge view means and thus is able to view a parent-child relationship between the knowledge entries or details of knowledge attribute descriptions of the knowledge entries.

The medical document management system includes the knowledge inquiry reception means and thus is able to receive an inquiry about details of stored and managed knowledge. It is also able to respond to details of an inquiry using the knowledge inquiry response means.

Also, the medical document management system includes the medical document details inquiry reception means and medical document details inquiry response means and thus is able to receive an inquiry about details of a stored and managed medical document and to respond to details of an inquiry.

The medical document management system includes the search scope management means. This makes it possible to create a name space, a knowledge tree, a knowledge entry, an entry attribute description, and a parent-child relationship link and manage an editing user, and to, in the medical document creation means, create a medical document, manage an editing user, and remove a portion of knowledge management means or a medical document created by a particular user or a user group from a search target range of the knowledge view means, or the knowledge inquiry reception means, or the medical document details inquiry reception means or, conversely, handle only a portion of knowledge management means or a medical document created by a particular user or user group as a search target range of the knowledge view means, or the knowledge inquiry reception means, or the medical document details inquiry reception means.

BRIEF DESCRIPTION OF THE DRAWINGS

FIG. 2 is a diagram showing an example of a knowledge entry management master of knowledge entry management means.

FIG. 3 is a diagram showing an example in which a knowledge entry attribute description is being made using a knowledge entry attribute category in knowledge entry attribute description management means.

FIG. 4 is a diagram showing an example of a knowledge entry attribute category master of knowledge entry attribute category management means.

FIGS. 5A and 5B show an example of knowledge entries structured into a tree and show some of the knowledge entries forming the knowledge tree. FIG. 5A is a diagram showing "symptoms/test findings", and FIG. 5B is a diagram showing an example of a knowledge tree "disease name."

FIG. 6 is a diagram showing a knowledge trees management master as knowledge trees management means.

FIG. 7 is a diagram showing an example of a knowledge tree management master of knowledge entry management means extended so as to be used for a knowledge tree structure and having the first column to which knowledge tree IDs are added.

FIG. 8 is an example of knowledge entry attribute category management means extended so as to be used for a knowledge tree structure and having the first column to which knowledge tree IDs are added.

FIGS. 9A and 9B are diagrams showing details of knowledge entry attribute category descriptions of "type I diabetes" and "type II diabetes."

FIGS. 11A to 11C are diagrams showing various embodiments of a reference link.

FIG. 12 is a diagram showing examples of a reference link having reference intensity.

FIG. 15 is a diagram showing a case link/disease name registration process following confirmation of a disease name.

FIG. 16 is a diagram showing an example in which not only symptoms or findings but also a list of pairs of simultaneously observed symptoms or findings are managed.

FIG. 17 is a diagram showing an example of compilation of the number of cases, the frequency of symptom/finding-specific observation, the frequency of disease name, and the like.

FIG. 19 is a diagram showing name space management means.

DESCRIPTION OF EMBODIMENTS

A document management system disclosed below includes the server apparatus, the database and the terminal. The server apparatus, the database and the terminal connected through network. The server apparatus is a prior computer. The server apparatus includes: an arithmetic apparatus including the processor, a main storage apparatus, an auxiliary storage apparatus, input apparatus, output apparatus, and communication apparatus. The arithmetic apparatus, the main storage apparatus, the auxiliary storage apparatus, input apparatus, output apparatus, the communication apparatus connected through a bus interface. The arithmetic apparatus includes the processor that can execute an instruction set. The main storage apparatus includes a volatile memory such as a random access memory (RAM). The auxiliary storage apparatus includes a recording medium such as a nonvolatile memory, and a recording method thereof is not limited. The recording medium indicates a hard disk drive (HDD) or a solid state drive (SSD), for example. The input apparatus is, for example, a keyboard device. The output apparatus includes, for example, display as a liquid crystal panel. The communication apparatus is a network interface that can connect to network. The processor of the server apparatus executes the function of the units of the document management system including: a knowledge management unit or the like. The database is composed of the auxiliary storage apparatus of the server apparatus or the auxiliary storage apparatus independent from the server apparatus. The database stores information managed by the document management system. The terminal is a prior computer including a processor.

Figure 1:
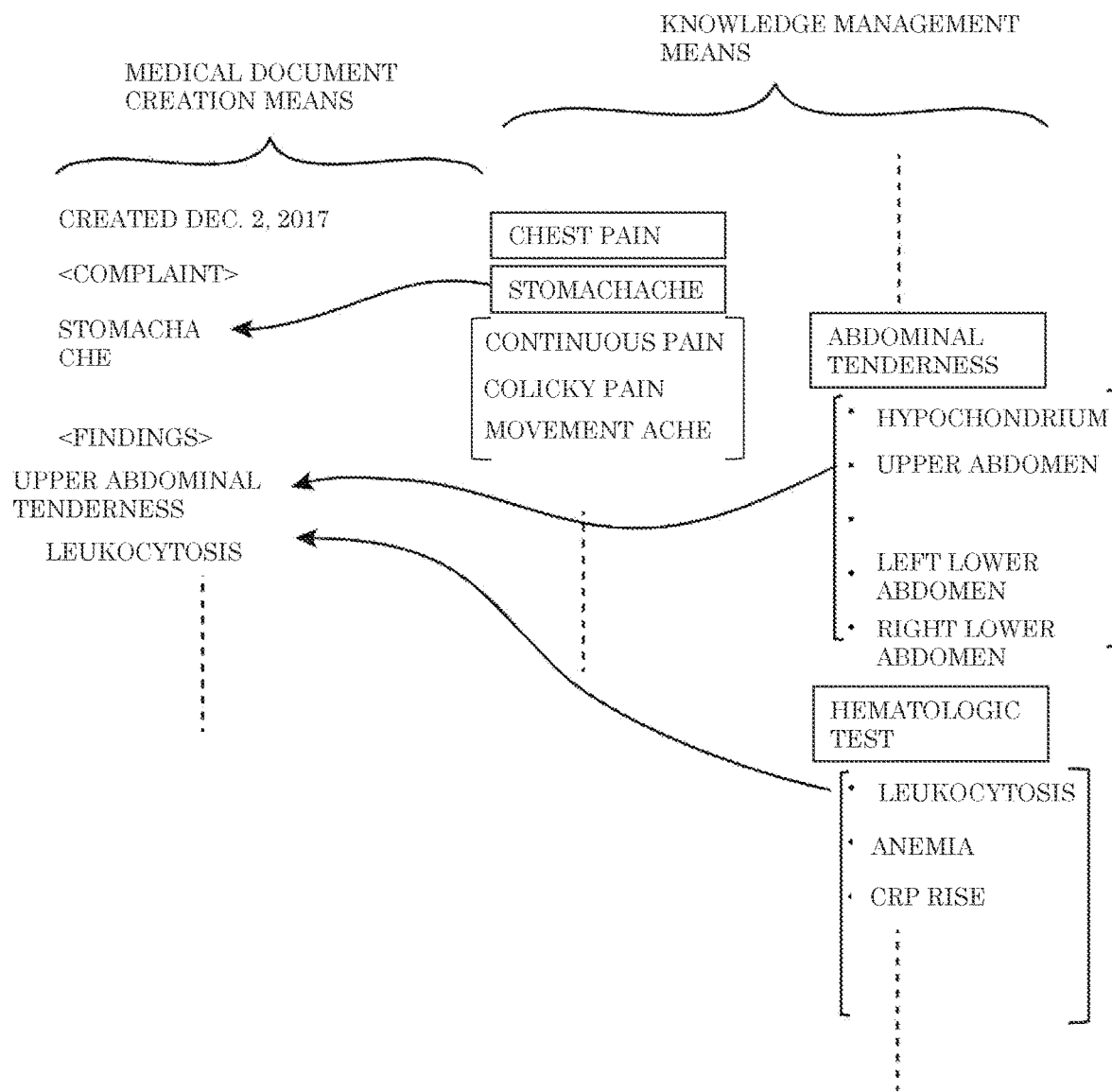
FIG. 1 is a diagram showing an example of the simplest medical document management system.

FIG. 1 shows the simplest example of a medical document management system of the present invention. The right half shows details of knowledge management means, and the left half shows details of medical document creation means. Chest pain, stomachache, abdominal tenderness, hematologic test, and the like are knowledge entries, and the contents of [ ] represent attribute descriptions of each knowledge entry.

The medical document creation means on the left side is formed by using words or phrases, such as the knowledge entry stomachache itself, upper abdominal pain, and leukocytosis, of the knowledge management means on the right side as reference links (knowledge management reference link use means). Upper abdominal pain is one of the attribute descriptions of the knowledge entry abdominal tenderness, and leukocytosis is one of the attribute descriptions of the knowledge entry hematologic test.

Note that the descriptions of a medical document preferably consist of reference links as much as possible, but may consist of typical free descriptions.

FIG. 2 shows a master file storing the IDs of the knowledge entries in the knowledge management means shown in FIG. 1 (knowledge entry management means).

The attribute descriptions of the knowledge entries is preferably stored as text, XML, JSON, or objects in any database, such as a relational database or mongodb, so as to be associated with knowledge entry IDs (knowledge entry attribute description management means).

As the amount of knowledge entry attribute descriptions is increased, the descriptions become less visible. For this reason, it is useful to store and manage the knowledge entry attribute descriptions such that the descriptions are categorized, as shown in FIG. 3.

FIG. 4 shows a master file for managing knowledge entry attribute category IDs. The knowledge entry attribute descriptions are preferably stored and managed in any database so as to be associated with the knowledge entry IDs and the knowledge entry attribute category IDs of FIG. 4 (knowledge entry attribute category management means).

Even the simple example where the knowledge entries are enumerated in parallel, as shown in FIGS. 1 to 4, produces some advantageous effects, such as the standardization of words and phrases. However, there is a limit to completely covering the words and phrases of the medical document, and it is necessary to structure the knowledge entries themselves into trees, as shown in FIGS. 5A and 5B and later figures.

Structured knowledge management means of the present invention will be outlined using medical knowledge as an example with reference to FIGS. 5A and 5B.

As example knowledge trees, FIG. 5 (*a*) shows "symptoms/test findings," and FIG. 5B shows "disease name."

Other conceivable knowledge trees include "drug," "treatment," "insurance claim," and the like. Each knowledge tree consists of an aggregate of knowledge entries coupled by parent- child relationships.

FIG. 6 shows an example of knowledge trees management means in which the knowledge tree IDs and knowledge tree names of the knowledge trees are managed in the form of a master table.

FIG. 5B shows knowledge entries forming a knowledge tree "disease name" as an example knowledge tree.

The knowledge entries of "disease name" are first categorized into major categories, such as "metabolic system", "digestive system," "locomotorium system," and "circulatory system." Each major category is categorized into medium categories, for example, "metabolic system" is categorized into "glucose metabolic system," "lipid metabolic system," "amino-acid metabolic system," and the like.

The medium category "glucose metabolic system" is categorized into minor categories, such as "diabetes" and "glycogenosis." The minor category "diabetes" includes "type I diabetes" and "type II diabetes."

Here, "type I diabetes," "type II diabetes," and the like serving as ends leaves of the knowledge tree are specific disease names. By pulling out these common attributes, the knowledge entries, such as the minor categories, medium categories, and major categories, serving as branches are formed. These knowledge entries serve as container-type knowledge entries containing the disease names, which are lower categories, i.e., leaves.

While these knowledge trees have a hierarchy consisting of the major, medium, and minor categories, a knowledge tree may have a deeper or shallower hierarchy depending on the area. While the disease state-based categorization criteria are used here, other types of categories may be used including site-specific categories, such as "nape," "neck," and "upper limbs," and etiology-specific categories, such as "inflammation-based," "tumor-based," "infection-based," and "heredity-based." The administrator of the knowledge management system preferably sets categorization criteria in accordance with the purpose. In some cases, multiple knowledge trees including different categories may be present in parallel.

FIG. 7 is an example of knowledge entry management means extended so as to be used for a knowledge tree structure.

In FIG. 7, the IDs of the knowledge entries in each knowledge tree (here, the knowledge tree having the knowledge tree ID "1" and the knowledge tree name "symptoms/findings") are managed in the form of a master table.

While, in this example, each knowledge entry name is assumed to be unique in the knowledge tree to which it belongs, it may include the waypoints on the path leading to that knowledge entry in the knowledge tree, as seen in "test findings/physical findings/chest/swelling" or "test findings/physical findings/abdomen/swelling" (path-dependent knowledge tree name). In this case, each knowledge entry name serving as a leaf is distinguished from the others on the basis of the path and therefore the waypoints thereof may overlap those of the others. Also, knowledge entries belonging to different knowledge trees are allowed to have the same name, since the knowledge trees are distinguished from each other by the knowledge tree IDs, as defined in FIG. 6.

While, in this diagram, the knowledge entries in the knowledge trees are centrally managed regardless of which knowledge tree each knowledge entry belongs to, the knowledge entries may be managed in different master tables created for the respective knowledge trees.

If the knowledge entry names are unique through the knowledge trees regardless of which knowledge tree each knowledge entry belongs to, there is no need for the knowledge tree IDs in the first column of FIG. 7.

If a change is made to the structure of the knowledge tree, for example, if a change is made to the parent-child relationship thereof, required modification work would be minimum as long as the knowledge entry names are unique. On the other hand, if the knowledge entries have path-dependent names, the knowledge entry names have to be redefined by recomposing the paths and thus modification work may be difficult.

FIG. 8 is an example of knowledge entry attribute category management means extended so as to be used for a knowledge tree structure.

In FIG. 8, the knowledge entry attribute category IDs of each knowledge tree (here, the knowledge tree having a knowledge tree ID of 2 and the knowledge tree name "disease name") are managed in the form of a master table.

While each knowledge entry attribute category name has to be unique in the knowledge tree to which it belongs to, knowledge entry attribute category names belonging to different knowledge trees are allowed to be the same since they are distinguished from each other by the knowledge tree IDs, as defined in FIG. 6.

While, in this diagram, the knowledge entry attribute categories in the knowledge trees are centrally managed regardless of which knowledge tree each knowledge entry attribute category belongs to, the knowledge entry attribute categories may be managed in different master tables created for the respective knowledge trees.

If the knowledge entry attribute category names are unique through the knowledge trees regardless of which knowledge tree each knowledge entry attribute category belongs to, there is no need for the knowledge tree IDs in the first column of FIG. 8.

FIGS. 9(*a*) and 9(*b*) show details of the knowledge entry attribute descriptions of "type I diabetes" and "type II diabetes" and correspond to the end leaves of the knowledge tree "disease name" of FIG. 5B. Both knowledge entry attribute descriptions are recognized to have many common portions.

To avoid the overlaps between the knowledge entry attribute descriptions, "diabetes" is set as a higher knowledge entry than both and the overlaps are pulled out. Thus, the overlaps between the knowledge entry attribute descriptions are eliminated, resulting in a reduction in the storage capacity and good visibility.

Figure 10:
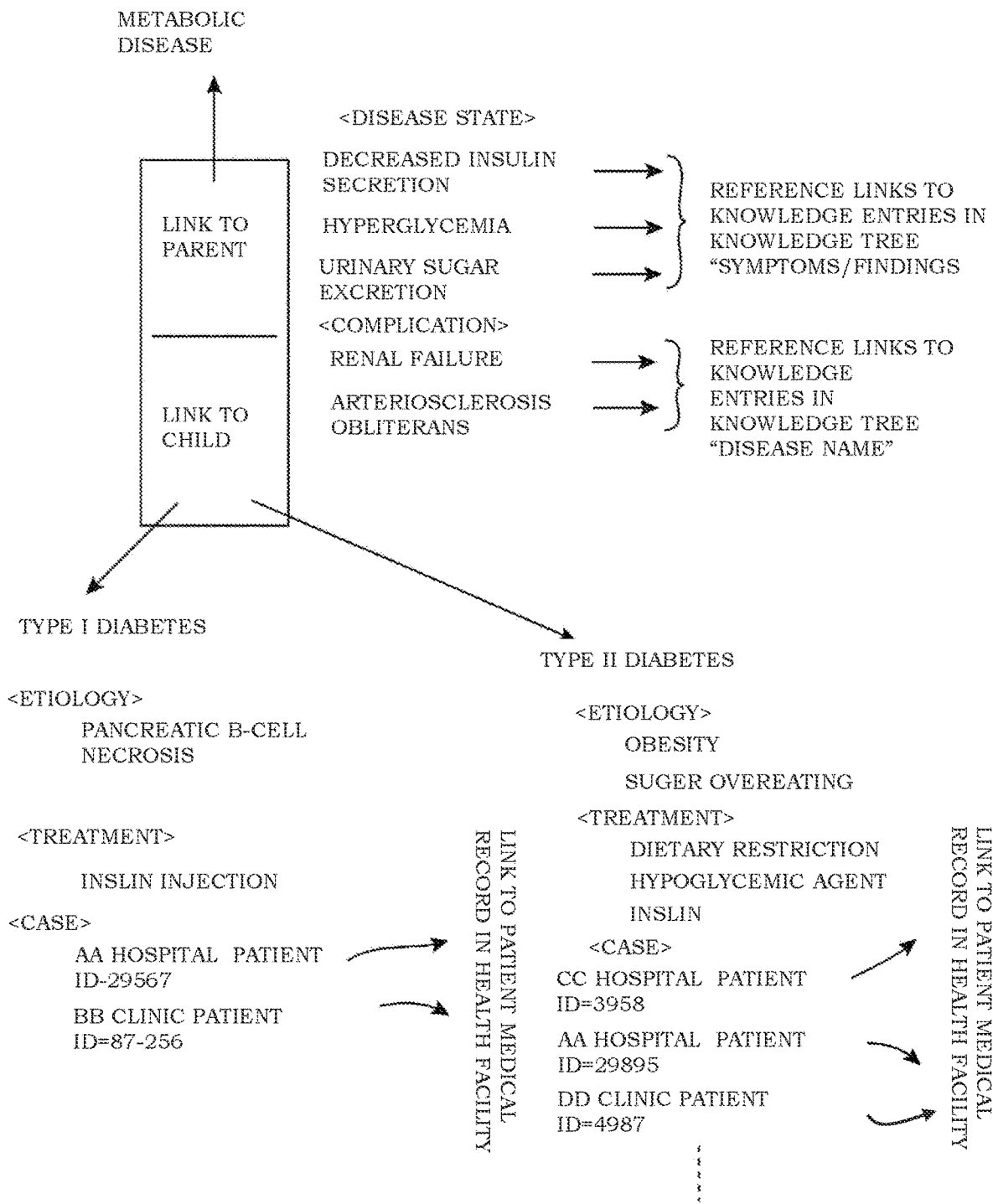
FIG. 10 shows parent-child relationships and attribute descriptions using, as an example, a knowledge entry "diabetes," which is one of container-type knowledge entries serving as branches, and "type I diabetes" and "type II diabetes" serving as leaves.

FIG. 10 shows parent-child relationships and attribute descriptions using, as an example, the knowledge entry "diabetes," which is one of container-type knowledge entries serving as branches, and "type I diabetes" and "type II diabetes" serving as leaves.

"Diabetes" has a link to "metabolic system" serving as a parent knowledge entry and links to "type I diabetes" and "type II diabetes" serving as child knowledge entries.

The knowledge entry attribute categories of "diabetes" include <disease state>, <complication>, and the like.

<Disease state>includes decreased insulin secretion, hyperglycemia, urinary sugar excretion, and the like.

The items of <disease state>consist of reference links to the corresponding knowledge entries of the knowledge tree "symptoms/findings," which is another knowledge tree.

As seen above, the attribute descriptions are made using a controlled vocabulary, as is done in a thesaurus, allowing for suppression of fluctuations in expression.

Of course, attribute descriptions may be directly made using character strings as is done conventionally. However, the attribute descriptions thus made are not preferable, since, in such attribute descriptions, it is difficult to suppress fluctuations and to utilize the functions of reference links (to be discussed later).

<Complication>includes "renal failure," "arteriosclerosis obliterans," and the like.

These complications have reference links to the corresponding knowledge entries in the same knowledge tree "disease name."

The etiology of "type I diabetes" is the rapid necrosis of the B cells of the pancreas and therefore supplementation by insulin injection is only treatment.

On the other hand, the etiology of "type II diabetes" is obesity, overeating of sugar, or the like, and the treatment is dietary restriction and oral administration of hypoglycemic agent and, finally, insulin injection.

As seen above, while "type I diabetes" and "type II diabetes" differs in <etiology>and <treatment>, they are common in other items, such as <disease state>and <complication>, and the common descriptions are described in the parent knowledge entry "diabetes."

Even if "type I diabetes" and "type II diabetes" serving as leaves have descriptions only in <etiology>and <treatment>, they inherit the attribute descriptions in <disease state>and <complication>of "diabetes" serving as a parent knowledge entry and, further, the attribute descriptions of higher knowledge entries, such as metabolic disease.

As seen above, the common attribute descriptions are pulled out to the parent knowledge entry and thus the child knowledge entries require only minimum attribute descriptions.

While the attribute descriptions of a knowledge entry may be formed in mind by tracking the individual parent-child relationships, the attribute descriptions are easily listed by using the knowledge entry attribute description inheritance means to inherit all the attribute descriptions of a knowledge entry serving as a parent of that knowledge entry and collectively displaying the attribute descriptions as seen in FIGS. 9(*a*) and 9(*b*).

The attribute descriptions inherited from the parent on a knowledge entry attribute category basis may become the knowledge entry attribute descriptions of the child knowledge entry as they are. On the other hand, if the child knowledge entry has knowledge entry attribute descriptions different from the inherited attribute descriptions in the knowledge entry attribute categories thereof, the knowledge entry attribute descriptions inherited from the parent are overwritten with the knowledge entry attribute descriptions of the child knowledge entry, or the latter is added to the former.

The overwritten or added attribute descriptions are further inherited to the grandson and lower knowledge entries. Selection as to whether to use overwriting or addition is preferably properly made using the knowledge entry attribute description inheritance means.

While attribute descriptions may be made without using knowledge entry attribute categories as shown in FIG. 1, use of knowledge entry attribute categories allows parent-to-child inheritance to be easily performed using the knowledge entry attribute description inheritance means on an attribute category basis.

Also, use of knowledge entry attribute categories is more useful, since it can facilitate overwriting or addition of attribute descriptions.

Note that the knowledge entry attribute descriptions are inherited from the parent to the child as long as the parent and child knowledge entries have an inclusion relationship (in this example, "type I diabetes" and "type II diabetes" are included in the parent knowledge entry "diabetes"). If the parent and child knowledge entries do not have an inclusion relationship about the content, for example, as seen in the table of contents and chapters of a book, which are simple enumerations, or the vehicle body and four tires, which have a parallel relationship as vehicle components, the knowledge entry attribute descriptions are not inherited.

Each knowledge entry attribute category <case>is storing case links to the medical records of cases having this disease name (case link creation means).

Thus, the patient records of this disease can be directly referred to.

The case links to the medical records of cases may be in any form, such as medical institution ID +patient ID, the URL of patient medical records, and patient medical record file name, as long as they can provide access to case information. Also, each knowledge entry may be provided with an attribute category, such as <literature>, and links to related books or files, or documents on the Web may be described in such an attribute category (external document reference means).

FIGS. 11A to 11C show various embodiments of a reference link.

FIG. 11A is an example showing the structure of hyperglycemia, which is a reference link in <disease state>of "diabetes" in FIG. 10.

This structure consists of "hyperglycemia," which is a label and is text used for display or the like, and a link to "hyperglycemia," which is a knowledge entry in the knowledge tree "symptoms/findings."

The label may be linked to <definition>, which is a knowledge entry attribute category in "hyperglycemia," as shown in FIG. 11B.

While this link is represented by "knowledge tree/knowledge entry/(knowledge entry attribute category)," it may be directly represented by the URL of the link destination.

The label is display content when a view or the like is made.

While the knowledge entry name of the link destination may be used as the label as it is, "hyperglycemia, blood sugar level>140 mg/dl" or the like may be used for visibility, as shown in FIG. 11C.

Thus, even if there is no step of individually referring to the link destinations, an outline can be easily grasped at a glance.

FIG. 12 shows reference links in a knowledge entry attribute category <side effects and incidence>of a knowledge entry "furosemide" of a knowledge tree "drug."

The first row consists of a label "hyperkalemia," a reference intensity of "5%," and a reference link to a knowledge entry "hyperkalemia" in the knowledge tree "symptoms/findings."

The second row consists of a label "dehydration," a reference intensity of "1%," and a reference link to a knowledge entry "dehydration" in the knowledge tree "symptoms/findings." Even if there are various side effects, the incidences thereof are not uniform.

By providing information about the incidence as the reference intensity, the order of side effects to be considered is clarified. The incidence is a priori probability in Bayesian probability. When side effects occur under multiple-drug administration, the incidence is useful in performing Bayesian inference in order to infer the causative drug.

By making the reference intensity variable in accordance with the observation frequency in the case, Bayesian inference or the like can be performed more accurately in accordance with the situation (reference intensity management means).

Figure 13:
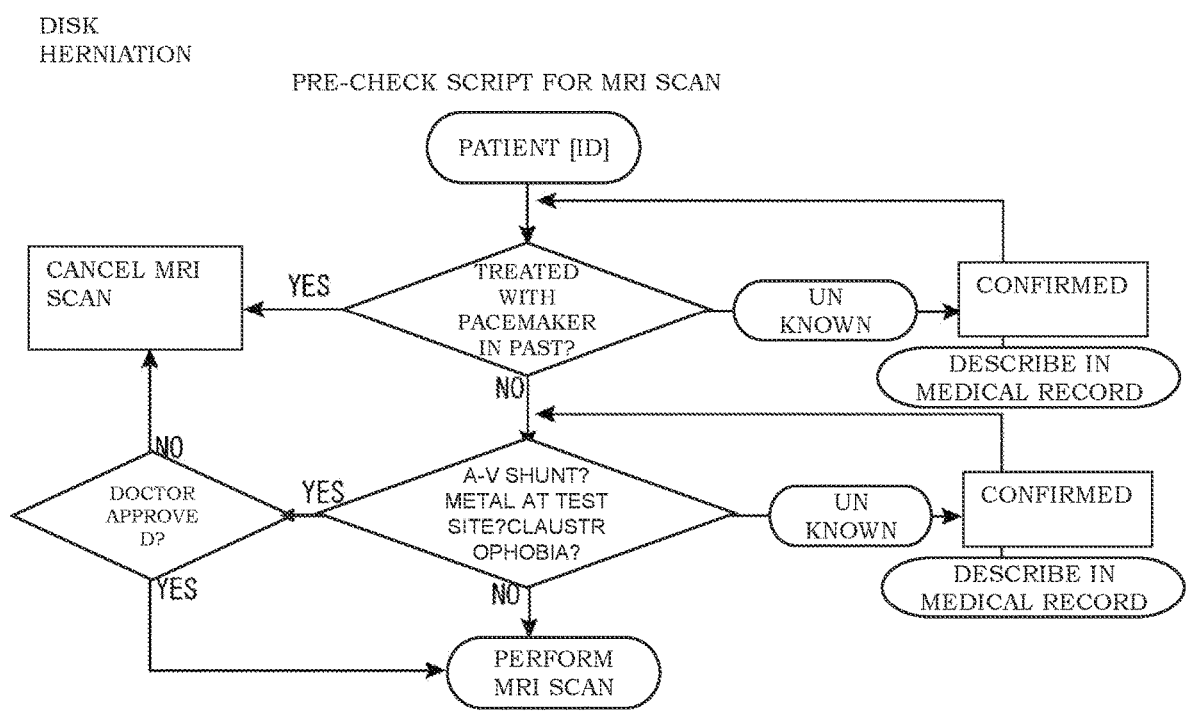
FIG. 13 shows an example of a script to be executed through reference links.

FIG. 13 shows a flowchart of a script for, when performing MRI, performing a pre-check in accordance with a link from a label "MRI" in a knowledge entry attribute category <test>of a knowledge entry "disk herniation" in the knowledge tree "disease name" to a knowledge entry "MRI" in a knowledge tree "test." While this script may be directly written in the reference link to "MRI", a link to the storage area of the script may also be written (script execution means).

Including reference intensity as described above or using reference characteristics management means that manages a script to be performed when making reference is useful in performing Bayesian inference or leads to elimination of check errors, resulting in an improvement in medical safety.

Figure 14:
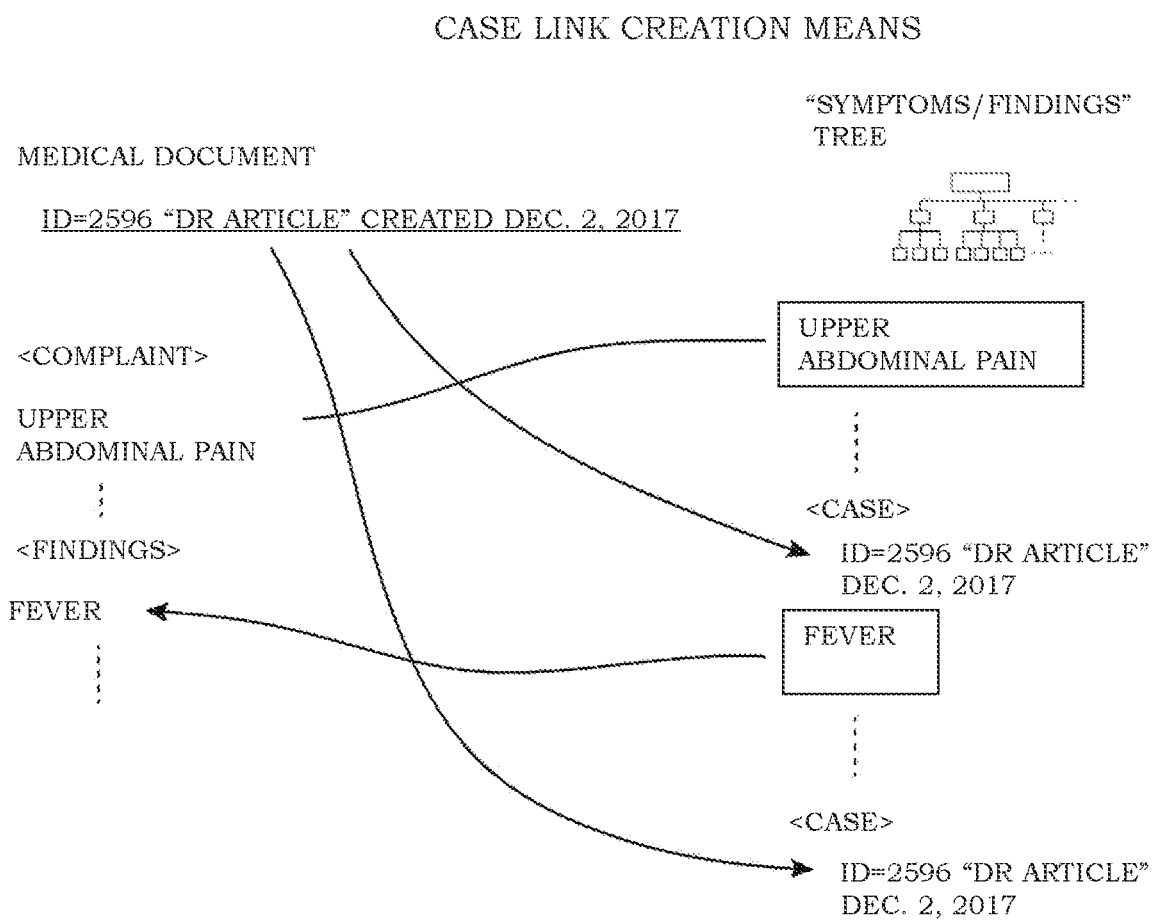
FIG. 14 is a diagram showing an example of case link creation means.

FIG. 14 shows an example of case link creation means that, when forming words and phrases used in a medical document using reference links from the knowledge tree "symptoms/findings," creates case links to the medical document in referenced knowledge entries (symptom/finding-specific case link creation means).

By using the case links from the knowledge entries accumulated by the case link creation means, a list of medical documents or cases in which a symptom or finding, such as "fever," was observed can be easily obtained. Here, managing the case links by previously providing a knowledge entry attribute category not only for each case having a positive finding, in which fever was observed, but also providing one, such as <negative case>, for each case having a negative finding, in which no fever was observed, is more useful to diagnose the disease name.

FIG. 15 shows a process after the disease name of a patient has been confirmed (here, "gastric ulcer").

First, a case link to the patient is registered in a knowledge entry attribute category <case>of a knowledge entry "gastric ulcer" of the knowledge tree "disease name."

Here, not individual medical documents of the patient serving as the ground of the diagnosis but the ID of the patient is registered. The reason is that while symptoms or findings occur in individual medical documents, the disease name is on a patient basis.

Here, it is preferred to register a case link to <case>in a knowledge entry representing a symptom or finding in a distinguished manner, for example, it is preferred to register a case link to <disease name-unconfirmed case>in the stage where the disease name is yet to be confirmed and to register a case link to <disease name-confirmed case>at the time point at which the disease name has been confirmed. This is less confusing.

The disease name "gastric ulcer" is registered in the knowledge entry attribute category <disease name>of a knowledge entry representing each of symptoms or findings observed in the patient.

Thus, a list of possible diagnosis names can be obtained for each symptom or finding.

Also, a case ID is registered in the knowledge entry attribute category <case>of a knowledge entry representing each of symptoms or findings observed in the patient.

Thus, a list of cases in which each symptom or finding has been observed can be easily obtained (confirmed disease symptom/finding-specific case link creation means).

Here, it is more useful to register a list of diagnosis names not only with respect to positive findings but also with respect to negative findings.

Similarly, a list of symptoms or findings observed in this case is registered in the knowledge entry attribute category <symptoms/findings>of the knowledge entry "gastric ulcer" itself.

Thus, a list of symptoms or findings is obtained for each disease. Here, it is more useful to register a list of symptoms or findings not only with respect to positive findings but also with respect to negative findings.

Also, by adding, to each row of the list of symptoms or findings, the ID of the case in which the symptom or finding has been observed, the case having the symptom or finding can be easily searched for.

FIG. 16 manages not only a list of symptoms or findings observed in each case but also a list of pairs of symptoms or findings simultaneously observed in each case.

Symptoms or findings are not necessarily independent from each other and may correlate with each other. In this case, if one symptom or finding is observed, another symptom or finding is often observed or unobserved.

In this case, even if correlating symptoms or findings are repeatedly observed, the amount of information newly obtained is small. Accordingly, when performing diagnosis, corelating symptoms or findings must be handled with reduced priority.

In such a case, it is difficult to identify the disease name using a simple list of observed symptoms or findings, and it is indispensable to compile pairs of simultaneously observed symptoms or findings.

Here, it is more useful to register a list of simultaneously observed symptoms or findings not only with respect to positive findings but also with respect to negative findings.

FIG. 17 shows compilation of the number of cases, the observation frequency of each symptom or finding, the frequency of each disease name, and the like from the list of cases, the lists of symptoms or findings, the lists of disease names, and the like obtained in FIG. 15, 16, and the like.

Although not shown, the frequencies of simultaneously observed symptoms or findings are also compiled from the lists of simultaneously observed symptoms or findings. Use of these compiled frequencies allows for inferring the disease name from observed symptoms or findings in a diagnosis name-unknown case or recommending a useful test to be performed next in order to confirm the diagnosis.

In routine clinical settings, the diagnosis name is often inferred by remembering past patients having similar symptoms or findings.

However, there is a limit to the number of cases experienced by an individual, and the memory of the individual is ambiguous. Accordingly, there is a limit to the accuracy of the diagnosis name.

As shown in FIG. 15, the attribute category <case>of a knowledge entry representing an observed each symptom or finding is managing a list of the case IDs of past cases in which this finding or symptom was observed.

By obtaining, from symptoms or findings sequentially observed in consultations, the intersection of lists of case IDs having these symptoms or findings, a set of cases satisfying all the symptoms or findings until that time point is obtained (similar case search means).

By compiling the confirmed disease names of the respective cases and arranging the disease names in the descending order of frequency, a list of candidate disease names of this case is obtained (similar case disease name inference means).

Another method to obtain a list of candidate disease names is a method of using a compilation table shown in FIG. 16.

The knowledge entry attribute category <disease name>of each symptom or finding is managing a list of disease names in which the symptom or finding was observed.

The frequency distribution of the disease name obtained from the compilation corresponds to the priori probability of the disease name in terms of Bayesian probability.

Each time a new symptom or finding is observed, the posteriori probability is preferably updated (disease name list inference means).

A question after multiple candidate disease names are obtained is what symptom or finding should be obtained next in order to obtain confirmed diagnosis.

As shown in FIG. 17, the frequency distribution of symptoms or findings is obtained for each of the obtained candidate disease names.

A comparison is made among the candidate disease names, and symptoms or findings among which the frequency greatly varies are useful to confirm the diagnosis.

As described above, preferably, the priority of symptoms or findings that are more likely to be observed simultaneously is reduced. Also, a consultation or test to obtain this symptom or finding is preferably performed, and the posteriori probability described in the preceding paragraph is preferably updated on the basis of the obtained observation result. The magnitude of the posteriori probability, which would change when the observation result is obtained, serves as the degree of contribution to confirmation of the diagnosis of the symptom or finding (consultation/test recommendation means).

In this case, if multiple consultations or tests have the same degree of contribution, one requiring less time and effort or less cost would be more practical. For this reason, it is preferred to previously converting the time and effort or cost of each consultation or test into numerical form and to display the degrees of contribution to confirmation of the diagnosis per cost in the descending order (consultation/test recommendation display means). When the posteriori probability reaches a given level, the object is achieved. Note that what is obtained here is a probabilistic inference and this probabilistic inference is provided as a suggestion or aid for diagnosis to a doctor or the like and, needless to say, is not diagnosis itself, which involves responsibility.

FIG. 16 shows the frequency distribution of each disease name and each symptom or finding. However, if the absolute number is small and the process described in the preceding paragraph is difficult to perform sufficiently, it is preferred to use the parent-child relationship link of each knowledge entry to use a higher knowledge entry serving as a parent. This is because the frequency distribution of the other child knowledge entries of the parent knowledge entry can also be compiled and added.

The compilation of the lists of symptoms or findings, disease names, cases, and the like allows for obtaining candidate disease names or recommending a candidate consultation or test to be performed next in order to identify the disease name.

Note that the present invention provides candidate disease names or recommendation of a consultation or test and these are probabilistic. In other words, the present invention provides judgement materials to a medical doctor or the like, who is responsible for judgement, and does not provide judgement itself.

While the knowledge trees shown in FIG. 5 relate to medical care, there are also other numerous areas in which knowledge should be described, such as art and industry.

A knowledge tree name is required to be unique so that it does not overlap other knowledge tree names. If the same knowledge tree name is used in an unknown other area, a troublesome problem occurs.

Figure 18:
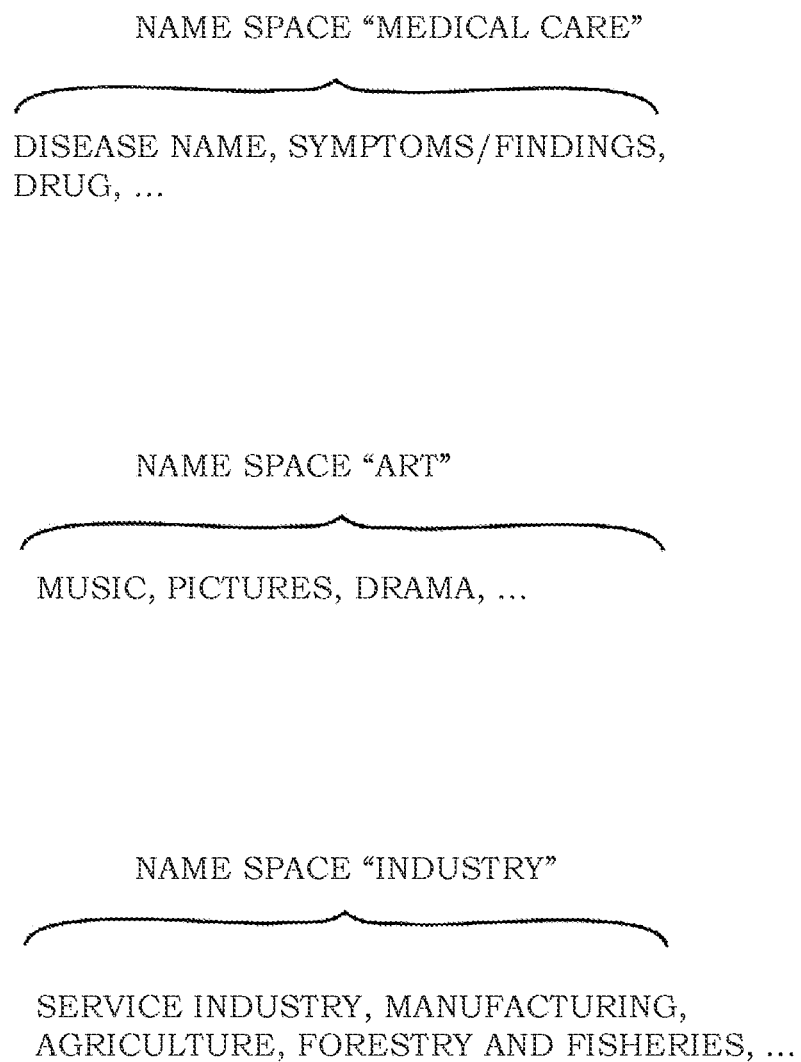
FIG. 18 is a diagram showing name space management.

To avoid this problem, a name space is set for each area, as shown in FIG. 18. Thus, a knowledge tree name becomes name space +knowledge tree and therefore knowledge tree names in other areas can be considered to be completely separate. FIG. 19 is an example in which name space IDs and name space names are managed in the form of a master table (name space management means). The name space IDs are added to the first column of FIG. 2, 4, 6, 7, or 8 as necessary. Thus, large-scale knowledge can be managed without confusion.

Figure 20:
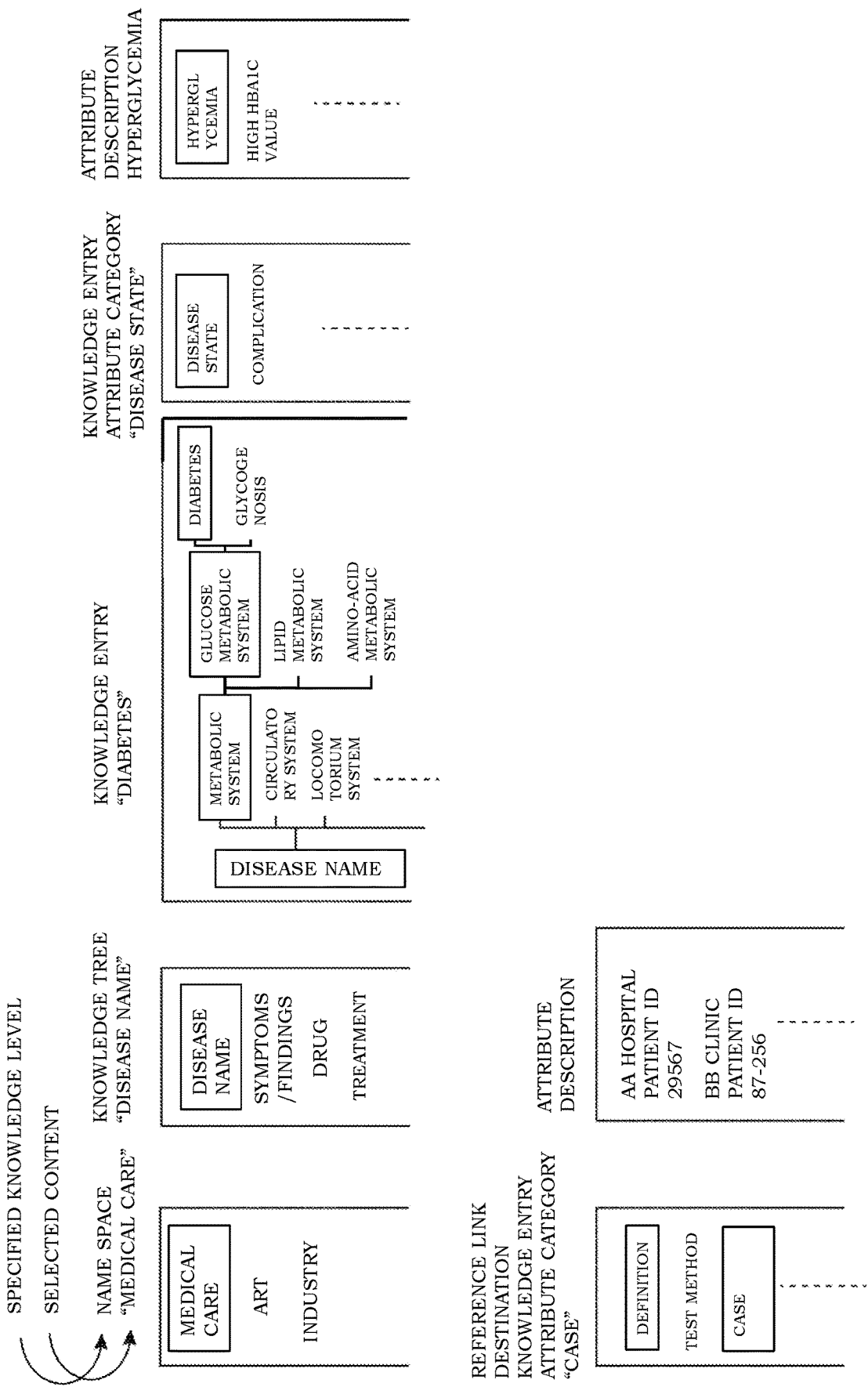
FIG. 20 is a diagram showing an example window configuration of knowledge view means.

FIG. 20 is an example of knowledge view means.

First, "medical care" is selected from a list of name spaces forming the first column from the left.

Thus, the names of knowledge trees belonging to the name space "medical care" are listed in the second column. When a knowledge tree "disease name" is selected, a list of major categories, such as metabolic system and circulatory system, is first shown.

When "metabolic system" is selected, a list of medium categories thereunder, such as "glucose metabolic system" and "lipid metabolic system," is listed.

When "glucose metabolic system" is selected, minor categories thereunder, such as "diabetes" and "glycogenosis," are listed.

When "diabetes" is selected, knowledge entry attribute categories, such as <disease state> and <complication>, are shown.

When <disease state> is selected, "hyperglycemia," which is an attribute description forming <disease state>, and reference links, such as "high HbA1c value," are shown.

When "hyperglycemia" is selected, there are shown <definition>, <test method>, and the like, which are attribute categories of a knowledge entry "hyperglycemia" in a knowledge tree "symptoms/findings," which is a reference link destination.

When <definition> is selected, details of this knowledge entry attribute category are shown.

While it is useful to take views manually as shown in FIG. 20, it is more useful to make am inquiry about search or the like to the knowledge management system, to perform a process, such as a set operation or logical operation, on the search result, and to display the result or download it into a file.

It is efficient to describe the series of inquiry steps in the form of script or the like and to sequentially automatically process the steps (knowledge inquiry reception means and knowledge inquiry response means).

Similarly, it is useful to make an inquiry about search or the like to a medical document, to perform a process, such as a set operation or logical operation, on the search result, and to display the result or download it into a file (medical document details inquiry reception means and medical document details inquiry reception means that responds to details of an inquiry).

It is assumed that the knowledge management system of the present invention will be constructed on cloud computing. However, some companies or hospitals are operating a knowledge management system on-premises without connecting to the Web, for security reasons.

In such a case, by providing the on-premises knowledge management system with knowledge export means that creates a knowledge management subset by extracting any portion of the name spaces, knowledge trees, knowledge entries, knowledge entry attribute descriptions, and parent-child relationship links forming the knowledge management system and exports the knowledge management subset to another knowledge management system and knowledge import means that imports the knowledge management subset extracted by the knowledge export means or a knowledge management subset from a separately constructed knowledge management system and integrates the name space, knowledge tree, knowledge entry, attribute description, or parent-child relationship into the on-premises knowledge management system for reconfiguration, part or all of the knowledge management system constructed on cloud computing may be incorporated into the on-premises knowledge management system.

If one company constructs an excellent knowledge management system on its own and another company wants to purchase it, part or all of the knowledge management system of the present invention may be transferred to the excellent knowledge management system according to a similar procedure.

The knowledge management system handles an enormous amount of information and therefore requires cooperation of many humans to create information.

It is indispensable to set, on humans involved, the authorities to perform creation, edit, deletion, reference, and the like of name spaces, knowledge trees, knowledge entries, knowledge entry attribute categories, knowledge entry attribute descriptions, and parent-child relationship links in accordance with the authorities or skills of the humans (user authority management means).

This can prevent a user who poorly understands the knowledge management system from breaking it. Also, by limiting the range of knowledge referenced by a user, knowledge that should be secret can be kept secret.

Database types on which the knowledge management system of the present invention can be implemented include graph database, relational database (RDB), which has often been used, key-value store (KVS), which has recently attracted attention as a method to process big data, and the like. Any type of database may be used but has advantages and disadvantages.

First, a graph database is good at setting and displaying a network graph relationship, but cannot be said to be fast in performing a large-scale process and is not suitable for large-scale knowledge management systems. The knowledge management system of the present invention can be implemented on an RDB by making a parent-child relationship link or knowledge entry attribute description in each row of a relation under the management of a master table consisting of name spaces, knowledge trees, knowledge entries, and knowledge entry attribute categories. An RDB provides highly flexible search, includes all query languages, including SQL, and has many conventional software assets. Accordingly, it is realistic to implement the knowledge management system on an RDB.

A KVS consists of one to several items of data (column) and a data set serving as a key. While a KVS is inferior to an RDB, which provides a wide variety of free search, it is able to perform a distributed process, such as a Map process or Reduce process, on even a large amount of data.

If electronic health records or the like are actually applied to the list of cases in each <case>, the <case> of "hyperglycemia" in the knowledge tree "symptoms/findings," or the like in FIG. 5, a list of an enormous number of cases would occur shortly.

The frequency distribution of one attribute is easily obtained even if any method is used. However, if the frequency of a case consisting of multiple factors, for example, the frequency of a case in which "a diabetes patient has HbA1c exceeding 10 and urine protein of 2+ or more," is obtained from data of a large number of cases, the processing ability of the RDB may be exceeded. In such a case, it is necessary to perform a set operation among a list of diabetes patients, a list of patients of HbA1c>10, and a list of patients of urine protein>2+. In such a case, it is extremely effective to perform a distributed process using Map/Reduce of a KVS.

In the knowledge management system of the present invention, the knowledge entries form a hierarchical structure. Thus, for example, when searching for a list of patients of "fever", the search range can be extended to lists of patients of "remittent fever," "continued fever," and the like, which are subordinate concepts of "fever," as necessary.

As seen above, the knowledge management system of the present invention may be implemented on any type of database. However, combined implementation, such as that in which the fundamental portion of the knowledge management system is processed on an RDB and a case list or the like is processed on a KVS, would be most effective.

Although the authorities to access the knowledge management system are set on users using the user authority management means, this is not enough.

There are examples in which followers of conflicting theories repeatedly overwrite each other's writes to deny them.

A solution to such a case is use of search scope management means that removes the writes of one particular user from the search target to prevent another user from viewing them. Thus, a peaceful solution is possible.

While "chest pain" is more likely to be diagnosed as myocardial infarction in a heart disease hospital, it is more likely to be diagnosed as rib fracture in an orthopedic outpatient department.

As seen above, the prior distribution of the incidence of a symptom or finding often varies among clinical departments or the like.

In such a case, it is useful to set a search scope in which similar clinical departments, medical institution types, and areas are combined.

While an embodiment has been described, the specific configuration of the present invention is not limited to the embodiment. Design changes or the like are also included in the present invention without departing from the spirit and scope of the present invention.

For example, while the present invention has been discussed using medical care as an example in the present application, it can also be discussed using education, personnel affairs, or the like as an example. The knowledge tree names, knowledge entry names, knowledge entry attribute category names, and the like shown in the figures are only illustrative and may be changed in accordance with the situation.

The categorization criteria, such as knowledge trees and knowledge entries, knowledge entry attribute categories, and the like must be carefully defined by an experienced designer.

The categorization criteria of the present application are only illustrative. Once categorization criteria are defined, fluctuations in subsequent description are minimized.

The invention claimed is:

1. A medical document management system comprising:
at least one memory storing instructions to perform operations; and
at least one processor configured to execute the instructions, the operations comprising:
(i) storing at least two knowledge entries, each comprising one or more attribute descriptions;
(ii) creating a medical document comprising word(s) and/or phrase(s) each selected from the at least two knowledge entries or the one or more attribute descriptions; and
(iii) issuing the medical document, wherein each of said word(s) and/or phrase(s) is described by a reference link to one of the at least two knowledge entries or one of the one or more attribute descriptions,
wherein the at least one processor is further configured to: manage at least one knowledge tree; and
manage at least one knowledge entry present in each knowledge tree of the at least one knowledge tree, wherein each knowledge entry of the at least one knowledge entry comprises:
a knowledge entry attribute description that describes an attribute about the at least one knowledge entry; and
a knowledge entry parent-child relationship link that describes a parent-child relationship with another knowledge entry of the at least one knowledge tree, and
the knowledge entry attribute description comprises a reference link to a knowledge entry belonging to a different knowledge tree or the same knowledge tree, or a knowledge entry attribute category of the knowledge entry, or a knowledge entry attribute description of the knowledge entry.

2. The medical document management system of claim 1, wherein the at least one processor is further configured to:
manage an knowledge entry attribute description such that the knowledge entry attribute description is categorized.

3. The medical document management system of claim 1, wherein the parent-child relationship further comprises:
a knowledge entry attribute description configured to inherit a knowledge entry attribute description of a parent knowledge entry as a knowledge entry attribute description of a child knowledge entry.

4. The medical document management system of claim 1, wherein the at least one processor is further configured to create a case link from the medical document comprising referenced words and phrases to a reference-source knowledge entry or a knowledge entry attribute description of the reference-source knowledge entry.

5. The medical document management system of claim 4, wherein the at least one processor is further configured to create a symptom/finding-specific case link in a knowledge entry representing each of symptoms or findings observed in a case or each of pairs of symptoms or findings simultaneously observed in the case.

6. The medical document management system of claim 5, wherein the at least one processor is further configured to categorize and compile case links on a symptom or finding basis.

7. The medical document management system of claim 5, wherein the at least one processor is further configured to, when a disease name of the case is confirmed, create the symptom/finding-specific case link to each of the simultaneously observed symptoms or findings in a knowledge entry representing the disease name.

8. The medical document management system of claim 5, wherein the at least one processor is further configured to obtain a list of cases similar to a disease name- unconfirmed case by obtaining an intersection of sets of already created case links with respect to each of symptoms or findings or pairs of symptoms or findings observed in the medical document.

9. The medical document management system of claim 8, wherein the at least one processor is further configured to:
compile confirmed disease names in the obtained list of similar cases and
display the confirmed disease names in a descending order of frequency.

10. The medical document management system of claim 5, wherein the at least one processor is further configured to infer a list of probable disease names of a disease name-unconfirmed case by using a disease name-specific symptom/finding observation frequencies compiled from symptoms or findings observed in the medical document using the symptom/finding-specific case link, or disease name frequency distribution about the observed respective symptoms or findings, or both.

11. The medical document management system of claim 10, wherein the at least one processor is further configured to obtain a list of symptoms or findings whose frequency distribution greatly varies among disease names, from the plurality of disease names obtained by the disease name list, using the disease name-specific symptom/finding observation frequencies compiled using the symptom/finding-specific case link and to infer a list of symptoms or findings to be obtained next that is effective in identifying the disease name, from the obtained list.

12. The medical document management system of claim 11, wherein the at least one processor is further configured to, when creating the medical document, automatically display a symptom or finding to be obtained through a consultation or a recommendation list of tests to be performed so that smooth creation of a consultation record or a test order is facilitated.

13. The medical document management system of claim 1, wherein the at least one processor is further configured to separate and manage a plurality of knowledge trees using name spaces.

14. The medical document management system of claim 1, wherein the at least one processor is further configured to:
create a knowledge management subset by extracting any portion of a name space, a knowledge tree, a knowledge entry, an entry attribute description, and a parent-child relationship link forming the knowledge management system and
export the knowledge management subset to another knowledge management system.

15. The medical document management system of claim 14, wherein the at least one processor is further configured to:
import the extracted knowledge management subset or import a knowledge management subset from a separately constructed knowledge management system and
reconfigure a name space, a knowledge tree, a knowledge entry, an entry attribute description, and a parent-child relationship link.

16. The medical document management system of claim 1, wherein the at least one processor is further configured to:
manage user-specific authorities to perform functions of creating, editing, deleting, and referring to a name space, a knowledge tree, a knowledge entry, a knowledge entry attribute category, a knowledge entry attribute description, and a parent-child relationship link and
manage user-specific authorities to perform functions of creating, editing, deleting, and referring to the medical document.

17. The medical document management system of claim 1, wherein the at least one processor is further configured to view a parent-child relationship between the at least two knowledge entries or details of knowledge attribute descriptions of the at least two knowledge entries.

18. The medical document management system of claim 1, wherein the at least one processor is further configured to
receive an inquiry about details of stored and managed knowledge and respond to details of an inquiry;
receive an inquiry about details of a stored and managed medical document and respond to details of an inquiry.

19. The medical document management system of claim 1, wherein the at least one processor is further configured to:
create a name space, a knowledge tree, a knowledge entry, an entry attribute description, and a parent-child relationship link and manage an editing user, and
create the medical document, manage an editing user, and remove a portion of a medical document created by a particular user or a user group from a search target range, or handle only a portion of the medical document created by a particular user or user group as the search target range.

20. A medical document management system, comprising:
at least one memory storing instructions to perform operations; and
at least one processor configured to execute the instructions, the operations comprising:
(i) storing at least two knowledge entries, each comprising one or more attribute descriptions;
(ii) creating a medical document comprising word(s) and/or phrase(s) each selected from the at least two knowledge entries or the one or more attribute descriptions; and
(iii) issuing the medical document, wherein each of said word(s) and/or phrase(s) is described by a reference link to one of the at least two knowledge entries or one of the one or more attribute descriptions,
wherein the reference link comprises an external document reference configured to refer to one or more external documents relating to the one or more attribute descriptions, or to
a description in the one or more external documents.

21. A medical document management system comprising:
at least one memory storing instructions to perform operations; and
at least one processor configured to execute the instructions, the operations comprising:
(i) storing at least two knowledge entries, each comprising one or more attribute descriptions;
(ii) creating a medical document comprising word(s) and/or phrase(s) each selected from the at least two knowledge entries or the one or more attribute descriptions;
(iii) issuing the medical document, wherein each of said word(s) and/or phrase(s) is described by a reference link to one of the at least two knowledge entries or one of the one or more attribute descriptions,
wherein the at least one processor is further configured to manage a script to be executed when making the reference link.

22. A medical document management system, comprising:
at least one memory storing instructions to perform operations; and
at least one processor configured to execute the instructions, the operations comprising:
(i) storing at least two knowledge entries, each comprising one or more attribute descriptions;
(ii) creating a medical document comprising word(s) and/or phrase(s) each selected from the at least two knowledge entries or the one or more attribute descriptions;
(iii) issuing the medical document, wherein each of said word(s) and/or phrase(s) is described by a reference link to one of the at least two knowledge entries or one of the one or more attribute descriptions,
wherein the at least one processor is further configured to:
set a reference intensity and
make the reference intensity variable in accordance with an observation.

* * * * *